(12) United States Patent
Ponnuraj et al.

(10) Patent No.: US 9,347,380 B2
(45) Date of Patent: May 24, 2016

(54) SYSTEM AND METHOD FOR EXPANDING A COMPRESSOR BLEED FLOW

(71) Applicant: General Electric Company, Schenectady, NY (US)

(72) Inventors: Balakrishnan Ponnuraj, Sugarland, TX (US); Eric Hongzhao Weng, Pearland, TX (US); Tu Duc Nguyen, Pearland, TX (US); Fernando Lopez-Parra, Warsaw (PL); Pawel Jan Jablecki, Warsaw (PL)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 13/759,975

(22) Filed: Feb. 5, 2013

(65) Prior Publication Data

US 2014/0182307 A1    Jul. 3, 2014

(51) Int. Cl.
*F02C 9/18* (2006.01)
*F02C 9/52* (2006.01)
*F02K 3/02* (2006.01)
*F02C 6/08* (2006.01)
(Continued)

(52) U.S. Cl.
CPC ... *F02C 9/18* (2013.01); *F02C 6/08* (2013.01); *F02C 7/185* (2013.01); *F02C 9/52* (2013.01); *F02K 3/02* (2013.01); *B64D 2013/0618* (2013.01); *F02C 3/13* (2013.01); *Y02T 50/675* (2013.01)

(58) Field of Classification Search
CPC ............... F02C 9/18; F02C 9/52; F02C 6/08; F02C 3/13; B64D 2013/0618; F01D 17/105; F02K 3/075; F02K 3/02; F05D 2260/606

USPC ............ 60/782, 785, 795, 262, 725; 181/213, 181/214
See application file for complete search history.

(56) References Cited

U.S. PATENT DOCUMENTS 3,584,972 A * 6/1971 Bratkovich et al. ....... 416/229 R
3,706,510 A   12/1972 O'Connor
(Continued)

FOREIGN PATENT DOCUMENTS

EP   2136053 A2   12/2009
GB   1352206 A    5/1974
(Continued)

OTHER PUBLICATIONS

GB Search Report and Written Opinion issued in connection with corresponding GB Application No. GB1322645.1 on Aug. 8, 2014.
(Continued)

*Primary Examiner* — Steven Sutherland
(74) *Attorney, Agent, or Firm* — Fletcher Yoder, P.C.

(57) ABSTRACT

A system includes a bleed system configured to direct a bleed flow from a high pressure region to a low pressure region. The bleed system includes a valve configured to control the bleed flow through the bleed system and a staged bleed conduit configured to incrementally depressurize the bleed flow. The staged bleed conduit includes an inlet coupled to the valve, a first stage configured to depressurize the bleed flow that is coupled to the inlet, a second stage configured to depressurize the bleed flow that is coupled to the first stage, and an outlet coupled to the second stage. The outlet is configured to direct the bleed flow to the low pressure region. The inlet, the first stage, the second stage, and the outlet are disposed along parallel axes.

19 Claims, 4 Drawing Sheets

(51) Int. Cl.
*F02C 7/18* (2006.01)
*F02C 3/13* (2006.01)
*B64D 13/06* (2006.01)

(56) References Cited

U.S. PATENT DOCUMENTS

| | | | |
|---|---|---|---|
| 3,880,186 A | 4/1975 | Turner et al. | |
| 4,058,141 A | 11/1977 | Hasinger et al. | |
| 4,818,446 A | 4/1989 | Schreiber et al. | |
| 5,060,471 A | 10/1991 | Torkelson | |
| 5,758,689 A | 6/1998 | Leinen | |
| 5,769,388 A | 6/1998 | Welker | |
| 6,343,672 B1* | 2/2002 | Petela et al. | 181/224 |
| 6,438,941 B1 | 8/2002 | Elliott | |
| 6,695,821 B1 | 2/2004 | Sjaarda | |
| 7,797,945 B2 | 9/2010 | Appleby et al. | |
| 7,998,253 B2 | 8/2011 | Gregg | |
| 8,511,096 B1 | 8/2013 | Haugen et al. | |
| 8,550,208 B1 | 10/2013 | Potokar | |
| 2007/0261410 A1* | 11/2007 | Frank et al. | 60/785 |
| 2009/0320496 A1 | 12/2009 | Faulder et al. | |
| 2010/0043447 A1* | 2/2010 | Kirby | 60/785 |
| 2010/0115964 A1* | 5/2010 | Kirby | 60/785 |

FOREIGN PATENT DOCUMENTS

| | | |
|---|---|---|
| GB | 2443418 A | 5/2008 |
| JP | 2008163947 A | 7/2008 |
| JP | 2011137448 A | 7/2011 |

OTHER PUBLICATIONS

Search Report and Written Opinion from Poland Patent Office, dated Mar. 21, 2013.

* cited by examiner

SYSTEM AND METHOD FOR EXPANDING A COMPRESSOR BLEED FLOW

CROSS-REFERENCE TO RELATED APPLICATIONS

This application is a Non-Provisional Application of Polish Patent Application No. P.402286, entitled "SYSTEM AND METHOD FOR EXPANDING A COMPRESSOR BLEED FLOW", filed Dec. 28, 2012, which is herein incorporated by reference in its entirety.

BACKGROUND OF THE INVENTION

The subject matter disclosed herein relates to gas turbine engines, such as a system and method for expanding a compressor bleed flow.

Gas turbine systems generally include a compressor, a combustor, and a turbine. The combustor combusts a mixture of compressed air and fuel to produce hot combustion gases directed to the turbine to produce work, such as to drive an electrical generator. The compressor compresses air from an air intake, and subsequently directs the compressed air to the combustor. However, some of the compressed air may not be directed to the combustor at all times. Some of the compressed air may be directed from the compressor to the other parts of the gas turbine system. Directing the compressed air to a lower pressure may cause vibration and noise within the gas turbine system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a bleed system configured to direct a bleed flow from a high pressure region to a low pressure region. The bleed system includes a valve and a staged bleed conduit configured to incrementally depressurize the bleed flow. The staged bleed conduit includes an inlet coupled to the valve, a first stage configured to depressurize the bleed flow that is coupled to the inlet, a second stage configured to depressurize the bleed flow that is coupled to the first stage, and an outlet coupled to the second stage. The inlet and the outlet are disposed along parallel axes.

In a second embodiment, a system includes a bleed system configured to direct a bleed flow from a high pressure region to a low pressure region. The bleed system includes a staged bleed conduit configured to incrementally depressurize the bleed flow. The staged bleed conduit has a variable conduit dimension. The staged bleed conduit includes an inlet configured to couple to the high pressure region, a first stage coupled to the inlet configured to depressurize the bleed flow by expansion, a second stage coupled to the first stage configured to depressurize the bleed flow by expansion, and an outlet coupled to the second stage. The inlet has an inlet dimension, the first stage has a first dimension greater than the inlet dimension, and the second stage has a second dimension greater than the first dimension. The inlet, the first stage, the second stage, and the outlet are disposed along parallel axes.

In a third embodiment, a system includes a gas turbine that includes a compressor configured to produce a bleed flow, a gas turbine coupled to the compressor, an exhaust outlet configured to receive an exhaust flow and the bleed flow, and a bleed system configured to direct the bleed flow from the compressor to the exhaust outlet. The bleed system includes a staged bleed conduit configured to incrementally depressurize the bleed flow. The staged bleed conduit includes an inlet coupled to the compressor, a first stage coupled to the inlet where the first stage is configured to depressurize the bleed flow by expansion, a second stage coupled to the first stage where the second stage is configured to depressurize the bleed flow by expansion, an outlet coupled to the second stage, and at least one diffuser plate configured to depressurize the bleed flow. The inlet has an inlet diameter, the first stage has a first diameter greater than the inlet diameter, and the second stage has a second diameter greater than the first diameter. The outlet is configured to direct the bleed flow to the exhaust outlet. The inlet, the first stage, the second stage, and the outlet are disposed along parallel axes.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
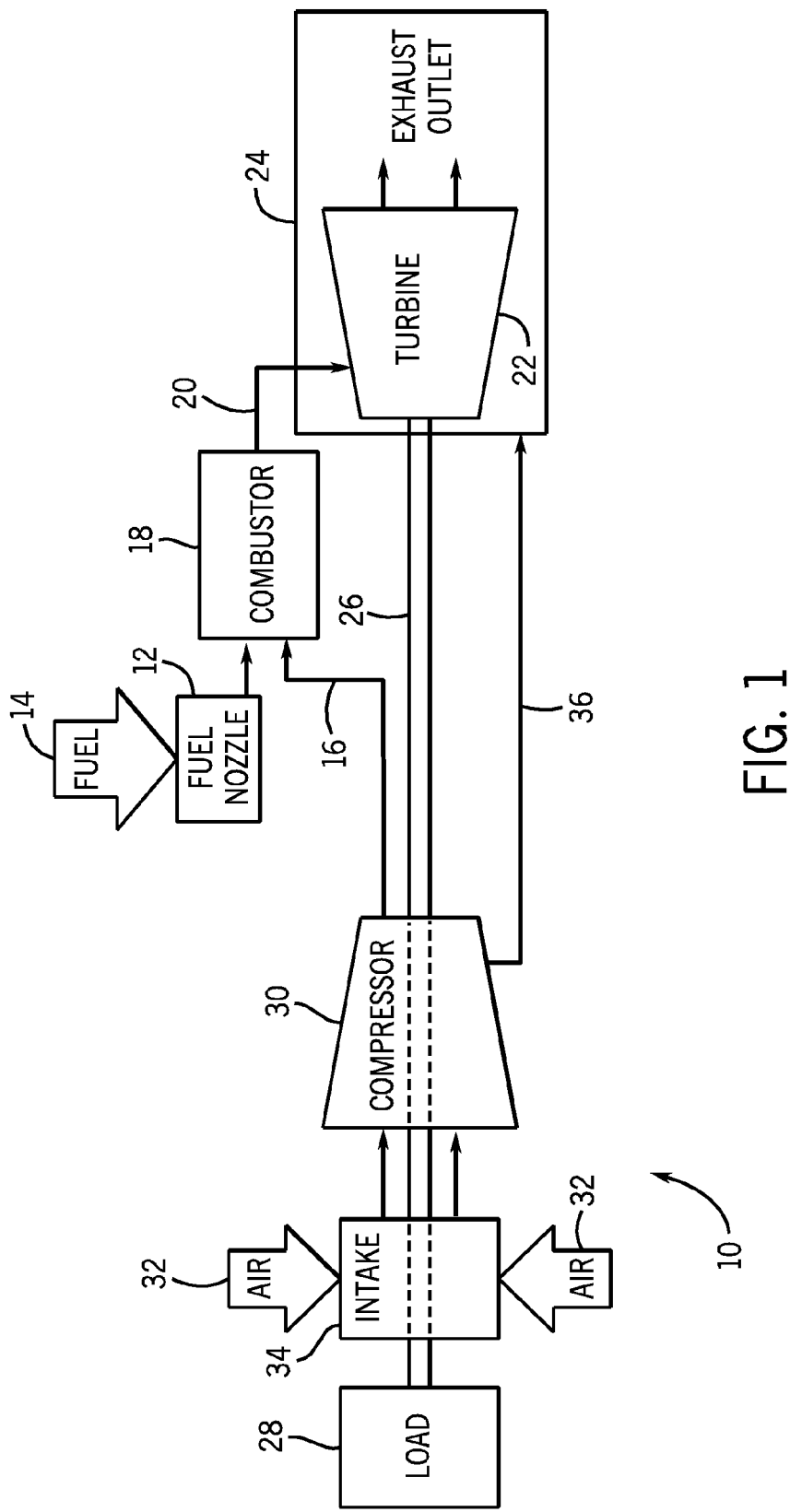
FIG. 1 is a schematic block diagram of an embodiment of a gas turbine system having a bleed system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A variety of systems, such as compressors, pumps, turbines, and various turbomachines may use a bleed system to bleed a fluid from one location to another. The bleed system may receive a bleed flow from a high pressure region and direct the bleed flow to a low pressure region. A staged bleed conduit of the bleed system is configured to gradually depressurize the bleed flow to reduce the vibration and/or noise of the bleed system, such as vibration of a bleed valve. The staged bleed conduit may have at least two stages to gradually (e.g., incrementally) depressurize the bleed flow. Each stage of the staged bleed conduit has an expansion section and/or a diffuser plate. The number of stages may be determined at least in part on the difference in pressure between the high pressure region and the low pressure region. More stages may be used for large pressure differences than for small pressure differences. Each stage may have a constant dimension (e.g., diameter) along its length, or expand downstream. The expansion sections increase the dimension of the staged bleed conduit to at least reduce the static pressure of the bleed flow. The diffuser plates partially obstruct the bleed flow and permit passage of the bleed flow through orifices. The diffuser plates are configured to at least reduce the kinetic energy or dynamic pressure of the bleed flow. The characteristics of the expansion sections (e.g., expansion percentage, size, cross-sectional shape, length) and diffuser plates (e.g., orifice size, orifice quantity, orifice shape, orifice configuration, diffuser plate size) affect the vibration of the bleed system. Various combinations of expansion sections and/or diffuser plates may be used together within the staged bleed conduit. The staged bleed conduit is configured with the stages having an expansion section and/or diffuser plates disposed along the staged bleed conduit to reduce the vibration of the bleed system. In some embodiments, the staged bleed conduit may also reduce vibration downstream of the bleed system.

Turning now to the drawings and referring first to FIG. 1, a block diagram of an embodiment of a gas turbine system 10 is illustrated. As described in detail below, the disclosed gas turbine system 10 (e.g., a gas turbine engine) may employ one or more fuel nozzles 12 to mix a fuel 14 with compressed air 16. The gas turbine system 10 may use liquid or gas fuel 14, such as natural gas and/or a hydrogen rich synthetic gas, to drive the gas turbine system 10. As depicted, the one or more fuel nozzles 12 intake the fuel 14, mix the fuel 14 with compressed air 16, and distribute the air-fuel mixture into a combustor 18 in a suitable ratio for optimal combustion, emissions, fuel consumption, and power output. The air-fuel mixture combusts within the combustor 18, thereby creating hot pressurized exhaust gases 20. The combustor 18 directs the exhaust gases 20 through a turbine 22 toward an exhaust outlet 24. As the exhaust gases 20 pass through the turbine 22, the exhaust gases 20 force turbine blades to rotate a shaft 26 along an axis of the gas turbine system 10. As illustrated, the shaft 26 may be connected to various components of the gas turbine system 10, including a load 28. The load 28 may be a part of a vehicle or a stationary load, such as a propeller on an aircraft or an electrical generator in a power plant, for example. The load 28 may include any suitable device capable of being powered by the rotational output of the gas turbine system 10. The shaft 26 may also be connected to the compressor 30. The compressor 30 also includes blades coupled to the shaft 26. As the shaft 26 rotates, the blades within the compressor 30 also rotate, thereby compressing air 32 from an air intake 34 through the compressor 30 and into the fuel nozzles 12 and/or combustor 18. As described in detail below, some of the compressed air 16 may be bled through a bleed system 36 as a bleed flow for various purposes. The bleed flow may be directed through the bleed system 36 to release excess pressure produced by the compressor 30, to protect the combustor 18 and/or turbine 22 from surge or stall conditions, to cool the exhaust gases 20 and/or turbine 22, to dilute or entrain the exhaust gases 20 through the exhaust outlet 24, and so forth.

Figure 2:
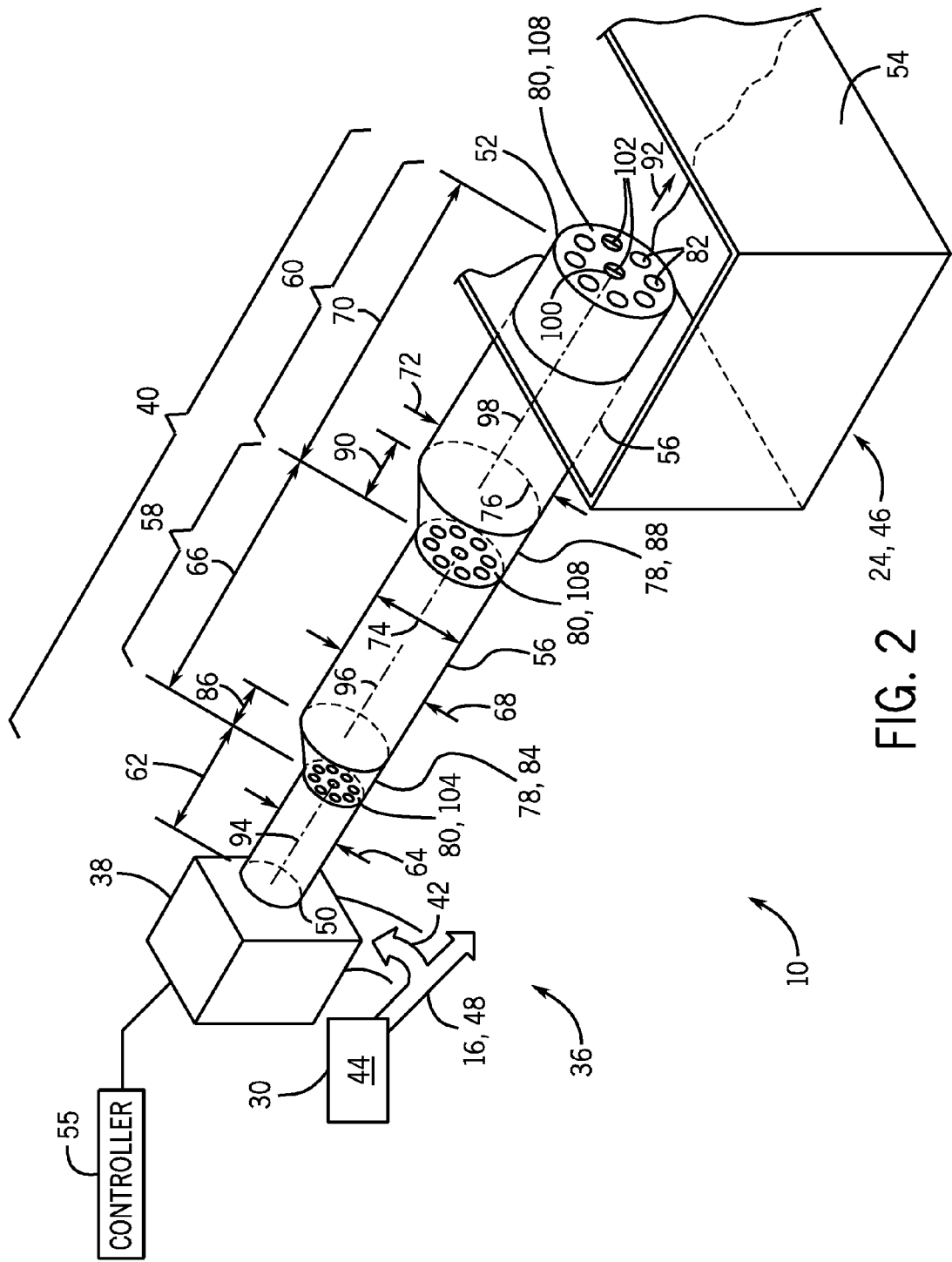
FIG. 2 is a perspective view of an embodiment of the bleed system of the gas turbine system of FIG. 1.

FIG. 2 illustrates an embodiment of the bleed system 36. The bleed system 36 illustrated includes a valve 38 and a staged bleed conduit 40. The bleed system 36 is configured to direct a bleed flow 42 from a high pressure region 44 (e.g., compressor 30) to a low pressure region 46 (e.g., exhaust outlet 24). The valve 38 is fluidly coupled to the high pressure region 44 to allow the bleed flow 42 to flow through the staged bleed conduit 40. The bleed flow 42 is a portion (e.g., less than approximately 5, 10, 15, 20, or 25 percent) of the main flow 48. For example, the main flow 48 may be the compressed air 16 from the compressor 30, and the bleed flow 42 may be a diverted portion of the main flow 48. The valve 38 is configured to open to enable the bleed flow 42 to pass from an inlet 50 of the staged bleed conduit 40 to an outlet 52 of the staged bleed conduit 40. The outlet 52 is configured to direct the bleed flow 42 into the low pressure region 46. In some embodiments, the low pressure region 46, such as the exhaust outlet 24, includes a wall 54 opposite the outlet 52. The exhaust outlet 24 may be configured to direct the bleed flow 42 for a number of uses such as to dilute and entrain exhaust gases or to cool turbine blades.

A controller 55 coupled to the valve 38 may be configured to control the mass flow of the bleed flow 42 through the staged bleed conduit 40. The controller 55 includes memory and a processor. The memory may be a machine readable media configured to store code or instructions to be used by the processor to control the valve 38. Opening the valve 38 permits a greater bleed flow 42 to pass through the staged bleed conduit 40. The valve 38 may be fully closed to substantially block the bleed flow 42 from passing through the staged bleed conduit 40. Adjusting the valve 38 adjusts the bleed flow 42 as a portion of the main flow 48, so that opening the valve 38 increases the bleed flow 42 and decreases the main flow 48, and closing the valve 38 decreases the bleed flow 42 and increases the main flow 48. In some embodiments, the bleed flow 42 may be adjusted to be between approximately 0% to 15%, 1% to 10%, or 4% to 8% of the main flow 48. The valve 38 may be any type of valve, including, but not limited to, a butterfly valve, a gate valve, a globe valve, or a check valve.

The bleed flow 42 diverted from the main flow 48 of the high pressure region 44 is more pressurized than the environment of the low pressure region 46. The high pressure region 44 is at a first pressure, and the low pressure region 46 is at a lower second pressure. The bleed flow 42 may rapidly flow from the inlet 50 at approximately the first pressure to the outlet 52 at approximately the second pressure. The rapid flow of the bleed flow 42 as it depressurizes may generate vibration and noise within the bleed system 36 unless otherwise mitigated as described herein. For example, throttling the bleed flow 42 with the valve 38 may perturb the bleed flow 42 to induce vibration and noise through cavitation, backpressure waves, or other effects from the depressurization. Presently contemplated embodiments of the bleed system 36 are configured to reduce vibrations and noise by depressurizing the bleed flow 42 in multiple stages (e.g., 2, 3, 4, 5, 6, 7, 8, 9, 10, or more stages). Reducing vibrations and noise may reduce fatigue, increase the life, and decrease maintenance of the bleed system 36, the high pressure region 44 (e.g., compressor 30), and/or the low pressure region 46 (e.g., exhaust outlet 24). Each stage of the bleed system 36 may be configured to depressurize the bleed flow 42 to reduce the vibration and noise. In some embodiments, the bleed system 36 is configured to reduce the vibration and noise from the depressurizing bleed flow 42 without substantially affecting the mass flow range of the bleed flow 42, which may be directed through the valve 38 by the controller 55. In some embodiments, each stage is configured to substantially match the expansion of the bleed flow 42 with perturbations inherent to the direction in which the control valve 38 opens to reduce the vibration and noise.

Rapid depressurization of a flow from a high first pressure to a low second pressure may cause vibration and noise by forming pressure waves. Slowing the rate of the depressurization of the flow and/or depressurizing the flow incrementally may decrease the vibration and noise caused by the flow by decreasing the magnitude of pressure waves. For example, depressurizing the flow from the first pressure to the second pressure over a short pipe length may cause a larger pressure wave than depressurizing the same flow from the first pressure to the second pressure over a longer pipe length. Reducing the vibration from the bleed flow 42 may decrease the wear of the valve 38, the bleed conduit 40, the outlet 52, and/or other parts of the gas turbine system 10. Reducing the vibration may increase the life of the valve 38 and bleed conduit 40. Some of the factors that affect the pressure of flow through a pipe (e.g., bleed flow 42 through the staged bleed conduit 40) include friction, length of flow, a nominal diameter (e.g., pipe diameter), and obstructions in the flow (e.g., valves, perforated plates, turns). Incrementally depressurizing the flow in stages may reduce the magnitude of pressure waves to reduce vibration and noise of the pipe (e.g., staged bleed conduit 40) and any coupled components. The stages may be configured to space the pressure waves to further reduce vibration and noise. In some embodiments, the pressure ratio between stages (e.g., second stage pressure/first stage pressure) is greater than approximately 0.528, which is the critical pressure for air. Maintaining the pressure ratio between stages over the critical pressure ratio may reduce the likelihood of supersonic flow and pressure waves that can cause vibration and noise.

The staged bleed conduit 40 includes two or more stages 56 to depressurize the bleed flow 42. Although FIG. 2 shows two stages 56 and an inlet, other embodiments may include between approximately 2 to 15 stages, approximately 3 to 10 stages, or approximately 4 to 8 stages, or any subrange therein. In some embodiments, a first stage 58 is coupled to the inlet 50 and a second stage 60 is coupled between the first stage 58 and the outlet 52. The inlet 50 has an inlet length 62 and an inlet dimension 64, the first stage 58 has a first length 66 and a first dimension 68, and the second stage 60 has second length 70 and a second dimension 72. The staged bleed conduit 40 may have a variable dimension 74 (e.g., diameter) from the inlet 50 to the outlet 52. In some embodiments, the staged bleed conduit 40 has a circular cross-section 76. Where the cross-section 76 is a circle, the characteristic dimensions such as the inlet dimension 64, the first dimension 68, and the second dimension 72, are diameters of the inlet 50, first stage 58, and second stage 60 respectively. Alternatively, the cross-section 76 may be in the shape of an oval, rectangle, hexagon, or other polygon, and each of the dimensions may be a side length or other characteristic dimension of the cross-section 76. In some embodiments, the cross-section 76 may differ among the stages 56 of the staged bleed conduit 40. For example, the inlet 50 may have a rectangular cross-section 76, the first stage 58 may have a circular cross-section 76, and the second stage 60 may have an oval cross-section 76.

The length and characteristic dimension of the inlet 50 and each stage 56 may be configured to gradually reduce the pressure of the bleed flow 42 to reduce the vibration and noise of the bleed system 36. In some embodiments, the length and characteristic dimension for the inlet 50 or a stage 56 may be configured so that the bleed flow 42 is fully developed before flowing to the next stage 56 or to the outlet 52. A fully developed flow has a substantially steady velocity profile across the cross-section 76. In some embodiments, the length and characteristic dimension of the inlet 50 or a stage 56 may be configured in a particular relationship. For example, the first length 66 may be approximately 3.5 to 4.5 times greater than the first dimension 68 and/or the second length 70 may be approximately 3.5 to 4.5 times greater than the second dimension 72. In some embodiments, the ratio between the inlet length 62 and the inlet dimension 64 is approximately 3.06, the ratio between the first length 66 and the first dimension 68 is approximately 4.12, and the ratio between the second length 70 and the second dimension 72 is approximately 4.02.

The staged bleed conduit 40 may be configured to depressurize the bleed flow 42 in each stage 56 by expansion through an expansion section 78 (e.g., a tapered conduit) and/or reducing the kinetic energy by way of a diffuser plate 80 (e.g., plate with diffusion holes or orifices 82). An expansion section 78 may be configured to increase the area of the cross-section 76 and decrease the static pressure of the bleed flow 42. A diffuser plate 80 is configured to impede the bleed flow 42 and decrease the dynamic pressure of the bleed flow 42 by reducing the kinetic energy of the bleed flow. Orifices 82 through the diffuser plate 80 permit the bleed flow 42 to flow through the diffuser plate 80. The staged bleed conduit 40 may include a plurality of stages 56, each stage 56 having an expansion section 78 or one or more diffuser plates 80, or combinations thereof. Some embodiments of the staged bleed conduit 40 are configured to use both expansion sections 78 and diffuser plates 80 to decrease the pressure (e.g., static pressure and dynamic pressure) of the bleed flow 42 to reduce vibrations. The expansion sections 78 and diffuser plates 80 may be disposed in the staged bleed conduit 40 to reduce vibrations of the bleed system 36 based at least in part on the mass flow, pressure, and kinetic energy of the bleed flow 42 through the staged bleed conduit 40. For example, some embodiments may have two stages 56 with an inlet 50, two expansion sections 78, and three diffuser plates 80 as illustrated in FIG. 2. Other embodiments may have multiple stages 56 (e.g., 2, 3, 4, 5, or more) with an inlet 50 and three or more diffuser plates 80. Other configurations of presently contemplated embodiments include more than two stages 56 and other quantities of expansion sections 78 and/or diffuser plates 80.

In some embodiments, each stage 56 may have an expansion section 78. For example, the staged bleed conduit 40 may include the inlet 50, the first stage 58 with a first expansion section 84 having a first width 86, the second stage 60 with a second expansion section 88 having a second width 90, and the outlet 52. The expansion section 78 increases the variable dimension 74 (e.g., diameter) of the staged bleed conduit 40 downstream towards the outlet 52. Each expansion section 78 couples a stage 56 having a relatively large characteristic dimension to the inlet 50 or to another stage 56 having a relatively small characteristic dimension. Each expansion section 78 has an expansion percentage that is a measure of the growth in the characteristic dimension (e.g., from the first dimension 68 to the second dimension 72). The expansion percentage of each expansion section 78 may be based on how the staged bleed conduit 40 is configured to reduce vibration and noise. For example, the first expansion percentage of the first expansion section 84 and the second expansion percentage of the second expansion section 88 may be approximately 25%. In some embodiments, one expansion sections 78 of a staged bleed conduit 40 have a different expansion percentage than another expansion section 78 of the same staged bleed conduit 40. The expansion percentage may be between approximately 5 and 50%, 10 and 40%, or 20 and 30%, or any subrange therein. In some embodiments, the width of each expansion section may be a percentage between 75 and 100% of the upstream characteristic dimension. For example, the first width 86 may be approximately 95% of the inlet dimension 64 and the second width 90 may be approximately 88% of the first dimension 68.

As described above, an expansion section 78 is configured to expand the bleed flow 42 to decrease the static pressure. In some embodiments, the stages 56 of the staged bleed conduit 40 may only include expansion sections 78 without any diffuser plates 80. As illustrated in FIG. 2, the variable dimension 74 of the staged bleed conduit 40 increases at each expansion section 78 from the inlet 50 to the outlet 52. The variable dimension 74 of the staged bleed conduit 40 may have three different values between the inlet 50 and the outlet 52. For example, the staged bleed conduit 40 may have an inlet dimension 64 smaller than the first dimension 68, which is smaller than the second dimension 72. The inlet 50 and each stage 56 are configured to enable the bleed flow 42 to flow in a substantially axial direction 92 along the staged bleed conduit 40. In some embodiments, the inlet 50 lies along an inlet axis 94, the first stage 58 lies along a first axis 96, and the second stage 60 lies along a second axis 98. The inlet axis 94, the first axis 96, and the second axis 98 may be the same axis or parallel axes. In some embodiments, the inlet 50, the first stage 58, and the second stage 60 may be concentric. As illustrated in FIG. 2, the inlet 50, the first stage 58, and second stage 60 may not be axisymmetric. As defined herein, the inlet, first, and second axes 94, 96, and 98 are offset parallel axes where the axes 94, 96, and 98 are parallel and the bleed flow 42 is not redirected (e.g., constricted) by a downstream stage. The inlet 50, first stage, 58, and second stage 60 illustrated in FIG. 2 have offset parallel axes 94, 96, and 98. The offset parallel axes 94, 96, 98 may be offset in the same radial direction so that the staged bleed conduit 40 opens in the axial direction.

Figure 3:
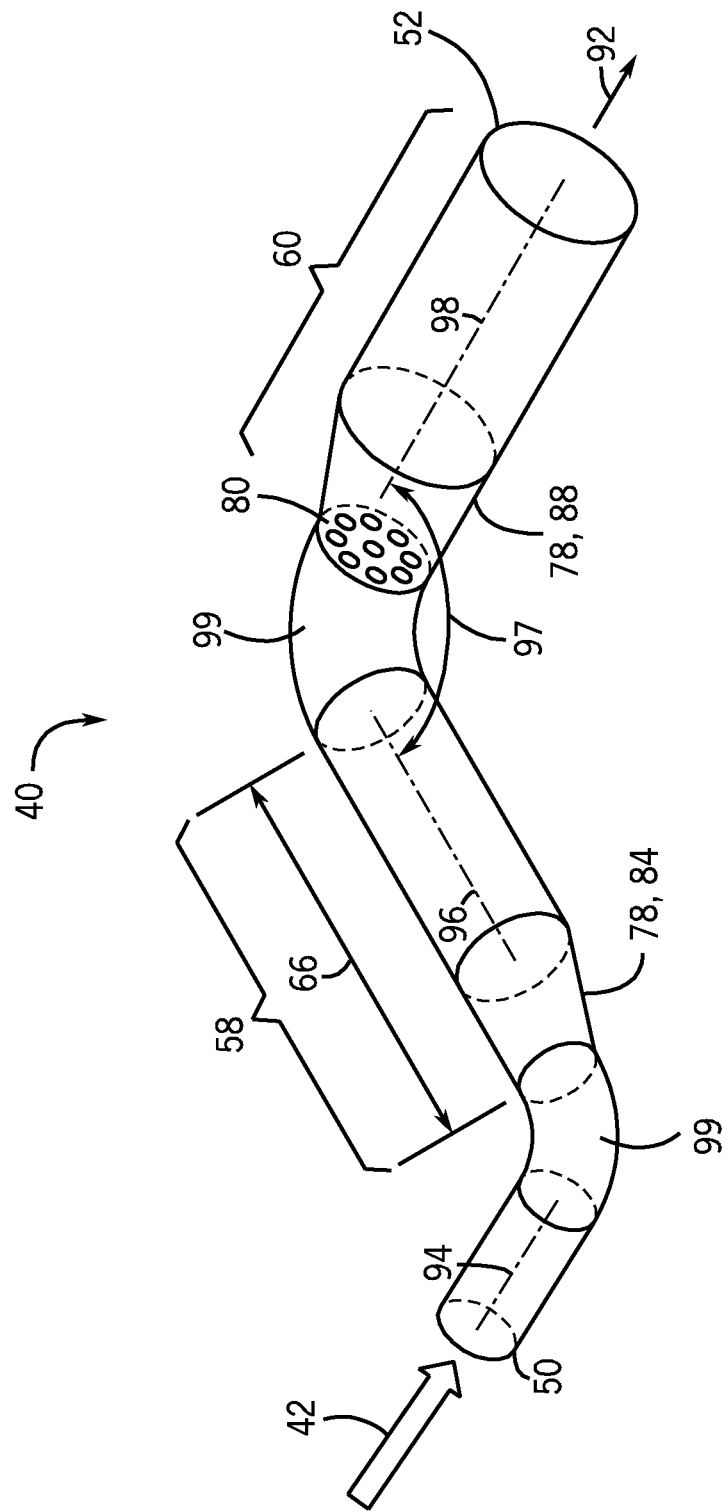
FIG. 3 is a perspective view of an embodiment of the bleed system of the gas turbine system of FIG. 1.

In some embodiments as shown in FIG. 2, the staged bleed conduit 40 is linear with parallel axes 94, 96, and 98. Alternatively, some embodiments may have one or more stages 56 that are not parallel to the inlet 50 and outlet 52. FIG. 3 illustrates an embodiment of a staged bleed conduit 40 in which the first axis 96 of the first stage 58 is perpendicular with the inlet axis 94 or the second axis 98. Other embodiments may have non-parallel stages (e.g., first stage 58) with axes at different angles 97 from the axial direction 92, including approximately 15°, 30°, 45°, 60°, 75°, or 90°. Elbows 99 join the non-parallel stage (e.g., first stage 58) to the inlet or other stages 56. The one or more elbows 99 may be configured to decrease the kinetic energy and pressure of the bleed flow 42. As may be appreciated, the length (e.g., first length 66) of the non-parallel stage may be configured to stabilize the bleed flow 42 prior to entering the next elbow 99 or stage 56.

Returning to FIG. 2, in some embodiments, the stages 56 of the staged bleed conduit 40 may only include diffuser plates 80. The diffuser plates 80 have a plurality of orifices 82 configured to condition the bleed flow 42 through the staged bleed conduit 40. In some embodiments, the diffuser plate 80 may have an outer row of orifices 82 arranged about a center orifice 100. Each of the orifices 82 has an orifice dimension 102 (e.g., diameter). In some embodiments, each orifice 82 is substantially the same size with the same orifice dimension 102. In other embodiments, the orifice dimension 102 is related to the variable dimension 74 at the diffuser plate 80. The diffuser plates 80 may be disposed at the beginning portion, middle portion, and/or end portion of a stage 56. For example, a first diffuser plate 104 may be disposed at the beginning portion of the first stage 58, a second diffuser plate 106 may be disposed at the beginning portion of the second stage 60, and a third diffuser plate 108 may be disposed at the end portion of the second stage 60 at the outlet 52. The plurality of orifices 82 of each diffuser plate 80 may be configured to reduce the kinetic energy of the bleed flow 42 and to reduce the vibration of the staged bleed conduit 42 and/or wall 54. For example, the diffuser plates 80 may be disposed along the staged bleed conduit 40 based on the variable dimension 74 and distance from the valve 38 to reduce vibration. The disposition of the diffuser plates 80 may be configured to reduce the kinetic energy of the bleed flow 42 in stages to incrementally depressurize the bleed flow 42.

Some embodiments of the staged bleed conduit 40 may have both expansion sections 78 and diffuser plates 80. The quantity of stages 56, expansion sections 78, and diffuser plates 80 may be related according to the following mathematical relationships:

$$N=X \quad (1)$$

$$D=N+1 \quad (2)$$

where N is the quantity of stages 56, X is the quantity of expansion sections 78, and D is the quantity of diffuser plates 80. The staged bleed conduit 40 of FIG. 2 exhibits these relationships (1) and (2). The expansion sections 78 and diffuser plates 80 may be arranged based on these relationships (1) and (2) to incrementally depressurize the bleed flow 42 and reduce vibration and noise of the gas turbine system 10. As discussed above, the diffuser plates 80 may be disposed at the beginning portion, middle portion, and/or end portion of each stage 56 of the staged bleed conduit 40. Other embodiments of the staged bleed conduit 40 may have quantities of stages 56, expansion sections 78, and diffuser plates 80 different than those defined in relationships (1) and (2). Presently contemplated embodiments include staged bleed conduits 40 with greater number of stages 56 for greater pressure differences between the high pressure region 44 and the low pressure region 46.

Figure 4:
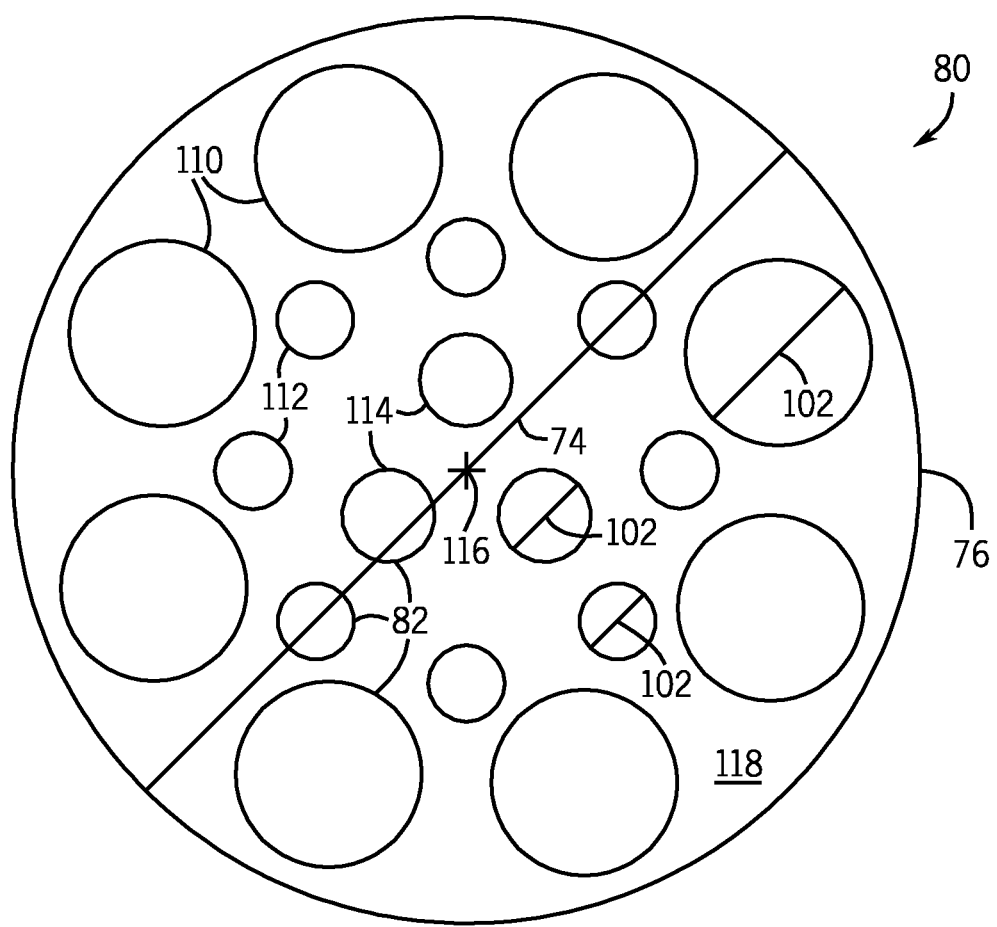
FIG. 4 is a front view of an embodiment of a diffuser plate of the bleed system of FIG. 2.

FIG. 4 illustrates an embodiment of a diffuser plate 80 with a plurality of orifices 82. As discussed above, the diffuser plate 80 may have a circular cross-section 76. Embodiments of the diffuser plate 80 may have between approximately 2 to 100, approximately 5 to 50, or approximately 7 to 20 orifices 82, or any subrange therein. Each of the orifices 82 may be in the shape of a circle, rectangle, slot, X-shape, V-shape, triangle, polygon, or other geometric shape. The orifices 82 may be arranged in various configurations, such as in concentric rows, in a grid pattern, or pattern matching the cross-section 76 (e.g., circular). For example, the diffuser plate 80 of FIG. 4 illustrates a first row or ring 110 of orifices 82, a second row or ring 112 of orifices 82, and a third row or ring 114 of orifices 82 in a generally concentric arrangement. Other embodiments may have more or less rows of orifices 82. In some embodiments, the diffuser plate 80 may have an orifice 82 about a centerline 116 of the diffuser plate 80. The diffuser plate 80 is configured to obstruct and reduce the kinetic energy of the bleed flow 42 through the staged bleed conduit 40. Some configurations of the diffuser plate 80 may reduce the kinetic energy and depressurize the bleed flow 42 more than other configurations. As such, the configuration of the plurality of orifices 82 is configured to reduce the vibration and noise of the staged bleed conduit 40 and/or other parts of the gas turbine system 10. For example, a diffuser plate 80 with a first configuration may be disposed in the first stage 58 and a diffuser plate 80 with a different second configuration may be disposed in the second stage 60.

In some embodiments, the configuration of the plurality of orifices 82 is based at least in part on the variable dimension 74 (e.g., diameter) of the staged bleed conduit 40 at the diffuser plate 80. For example, the orifice dimension 102 may be approximately 28% of the variable dimension 74. In some embodiments, the orifice dimension 102 may be between approximately 10 to 40%, approximately 15 to 30%, or approximately 20 to 25% of the variable dimension 74, or any subrange therein.

The quantity of orifices 82 disposed through the diffuser plate 80 is based at least in part on the effect of the orifices 82 on the bleed flow 42, such as the vibration and/or noise caused or reduced by the orifices 82. In some embodiments, the diffuser plate 80 has only a large quantity of small orifices 82 (e.g., relatively sized like the second row 112). In other embodiments, the diffuser plate 80 has only a small quantity of larger orifices 82 (e.g., relatively sized like the first row 110). The quantity and size of the orifices 82 affects the mass flow of the bleed flow 42 through the diffuser plate 80. The plate surface 118 obstructs the bleed flow 42, and the orifices 82 permit the bleed flow 42. In some embodiments, the total area of the orifices 82 may be between approximately 35 to 75%, approximately 45 to 65%, or approximately 50 to 60% of the cross-sectional area where the diffuser plate 80 is disposed. For example, a point of the staged bleed conduit 40 with a variable dimension 74 (e.g., diameter) of approximately 10 cm has a circular cross-sectional area of approximately 78.54 cm². For a diffuser plate 80 with seven circular orifices 82 disposed at that point where the orifice dimensions 102 (e.g., diameters) are approximately 28.5% of the variable dimension 74 (i.e., 2.85 cm), the total area of the orifices 82 may be approximately 44.66 cm², or approximately 57% of the circular cross-sectional area of the staged bleed conduit 40 at that point. This example is intended to clearly demonstrate a relationship between the variable dimension 74 and the quantity and size of the orifices 82 in some embodiments. The staged bleed conduit 40 and diffuser plate 80 are not intended to be limited to the sizes and configurations of this example. Other embodiments of the staged bleed conduit 40 and diffuser plates 80 may have different variable dimensions 74, different orifice dimensions 102, and different quantities of orifices 82.

In some embodiments, the orifice dimension 102 for orifices 82 of different diffuser plates 80 is based on the same relationship with the variable dimension 74 at each respective diffuser plate 80. For example, the first diffuser plate 94 of FIG. 2 may have a variable dimension 74 (e.g., diameter) of approximately 10 cm, and orifice dimension 102 (e.g., diameter) of approximately 2.5 cm (i.e., approximately 25% of 10 cm). The second diffuser plate 96 may have a variable dimension 74 of approximately 12.5 cm, and orifice dimension 102 of approximately 3.13 cm (i.e., approximately 25% of 12.5 cm). In other embodiments, the orifice dimension 102 for orifices 82 of different diffuser plates 80 is the same irrespective of the variable dimension 74 at each respective diffuser plate 80. For example, the first diffuser plate 94 of FIG. 2 may have a variable dimension 74 (e.g., diameter) of approximately 10 cm, and orifice dimension 102 (e.g., diameter) of approximately 2.5 cm (i.e., approximately 25% of 10 cm). The second diffuser plate 96 may have a variable dimension 74 of approximately 12.5 cm, and orifice dimension 102 of approximately 2.5 cm, that is the same as the orifice dimension 102 of the first diffuser plate 94. In some embodiments, the second diffuser plate 96 may have the same quantity or more orifices 82 than the first diffuser plate 94.

In some embodiments, the orifices 82 of each diffuser plate may have different orifice dimensions 102 based on the disposition on the diffuser plate 80. For example, as shown in FIG. 4, the first row 110 may be larger than the second row 112 and third row 114. The quantity of orifices 82 of each row may differ among the rows. As shown in FIG. 4, the first row 110 and the second row 112 have eight orifices 82, and the third row 114 has three orifices. The orifice dimension 102, quantity of orifices 82, and configuration of orifices 82 may be configured with a combination of any of the above described orifice configurations to affect the bleed flow 42 through the diffuser plate 80 to reduce vibration and/or noise.

Technical effects of the invention include that the staged bleed conduit is configured to reduce vibration and/or noise of the bleed system, including the valve and/or exhaust outlet downstream of the bleed system. Reducing the vibration may reduce maintenance costs for the bleed system, valve, and/or the gas turbine system. Reducing the vibration may also extend the life of the gas turbine. The staged bleed conduit is configured to gradually (e.g., incrementally) reduce the pressure and kinetic energy of the bleed flow. The staged bleed conduit may also reduce the likelihood of supersonic flows that may cause pressure waves. Some embodiments of the staged bleed conduit are configured to receive a bleed flow with a high pressure of approximately 1.72 MPa (250 psia) to 2.41 MPa (350 psia) to substantially lower pressure, such as approximately the pressure of the external environment. Different configurations of expansion sections and diffuser plates of embodiments may be based on the mass flow, pressure, and velocity of the bleed flow of the embodiment. Gradually reducing the pressure along the length of the staged bleed conduit may increase the effective area of the outlet more than increasing the dimension (e.g., diameter) of the bleed conduit at the outlet alone and/or placing a diffuser plate alone at the outlet. The staged bleed conduit may be used for bleed flows from a compressor or another system that discharges a highly pressurized flow into a low pressure region.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
   a bleed system configured to bypass a combustor of the system and to direct a bleed flow from a compressor to an exhaust outlet, wherein the bleed system comprises:
      a valve; and
      a staged bleed conduit configured to incrementally depressurize the bleed flow, wherein the staged bleed conduit comprises:
         an inlet coupled to the valve, wherein the inlet is upstream of the combustor;
         a first stage coupled to the inlet, wherein the first stage is configured to depressurize the bleed flow;
         a second stage coupled to the first stage, wherein the second stage is configured to depressurize the bleed flow;

an outlet coupled to the second stage and the exhaust outlet, wherein the inlet and the outlet are disposed along parallel axes, and the outlet is downstream of the combustor; and at least one diffuser plate disposed at the inlet, the first stage, the second stage, or the outlet, or a combination thereof.

2. The system of claim 1, wherein at least one of the first stage and the second stage is configured to depressurize the bleed flow by expansion, and the inlet, the outlet, the first stage, and the second stage are disposed along parallel axes.

3. The system of claim 1, wherein at least one of the first stage and the second stage is configured to depressurize the bleed flow by expansion.

4. The system of claim 1, wherein a first diffuser plate of the at least one diffuser plate is disposed in the staged bleed conduit at a first location having a first cross-sectional area, and the first diffuser plate comprises a plurality of orifices having a total orifice area, wherein the total orifice area is greater than 40% of the cross-sectional area.

5. The system of claim 1, wherein each diffuser plate of the at least one diffuser plate comprises a plurality of orifices, and each of the plurality of orifices has a common dimension.

6. The system of claim 1, wherein each diffuser plate of the at least one diffuser plate comprises a plurality of orifices, and a size of the plurality of orifices is based at least in part on a dimension of the staged bleed conduit at a location of the respective diffuser plate.

7. The system of claim 1, wherein the parallel axes consist of a common axis.

8. The system of claim 1, wherein the bleed system is configured to reduce vibrations within the valve or the staged bleed conduit.

9. The system of claim 1, comprising
a gas turbine coupled to the compressor, wherein combustion products from the gas turbine are configured to flow to the exhaust outlet.

10. The system of claim 9, wherein the compressor is configured to produce a compressed air flow and the bleed flow, and the valve is configured to control the bleed flow to less than 10% of the compressed air flow.

11. A system, comprising:
a bleed system configured to bypass a combustor of the system and to direct a bleed flow from a compressor to an exhaust outlet, thereby bypassing the combustor of the system, wherein the bleed system comprises:
a staged bleed conduit configured to incrementally depressurize the bleed flow, wherein the staged bleed conduit has a variable conduit dimension, and the staged bleed conduit comprises:
an inlet configured to couple to the compressor, wherein the inlet has an inlet dimension, and the inlet is upstream of the combustor;
a first stage coupled to the inlet, wherein the first stage has a first dimension greater than the inlet dimension, and the first stage is configured to depressurize the bleed flow by expansion;
a first diffuser plate coupled between the inlet and the first stage;
a second stage coupled to the first stage, wherein the second stage has a second dimension greater than the first dimension and the second stage is configured to depressurize the bleed flow by expansion;
a second diffuser plate coupled between the first stage and the second stage; and
an outlet coupled to the second stage and to the exhaust outlet, wherein the inlet, the first stage, the second stage, and the outlet are disposed along parallel axes, and the outlet is downstream of the combustor.

12. The system of claim 11, wherein the staged bleed conduit comprises:
a first expansive section coupled between the inlet and the first stage, wherein the first expansive section has a first expansion percentage;
a second expansive section coupled between the first stage and the second stage, wherein the second expansive section has a second expansion percentage.

13. The system of claim 12, wherein first expansion percentage and the second expansion percentage are between 10 to 40%.

14. The system of claim 11, wherein the first stage has a first length between 3.5 and 4.5 times greater than the first dimension, and the second stage has a second length 3.5 and 4.5 times greater than the second dimension.

15. The system of claim 11, wherein the first diffuser plate comprises a first plurality of orifices, each orifice of the first plurality of orifices comprises a first orifice dimension between 20% and 30% of the inlet dimension the second diffuser plate comprises a second plurality of orifices, and each orifice of the second plurality of orifices comprises a second orifice diameter between 20% and 30% of the first dimension.

16. The system of claim 11, comprising:
a gas turbine coupled to the compressor, wherein combustion products from the gas turbine are configured to flow to the exhaust outlet.

17. A system, comprising:
a gas turbine engine comprising:
a compressor configured to produce a bleed flow;
a gas turbine coupled to the compressor;
an exhaust outlet configured to receive an exhaust flow from the gas turbine and the bleed flow from the compressor; and
a bleed system configured to direct the bleed flow from the compressor to the exhaust outlet, wherein bleed system comprises:
a staged bleed conduit coupled to the exhaust outlet, wherein the staged bleed conduit is configured to incrementally depressurize the bleed flow comprising:
an inlet coupled to the compressor, wherein the inlet has an inlet diameter;
a first stage coupled to the inlet, wherein the first stage has a first diameter greater than the inlet diameter, and the first stage is configured to depressurize the bleed flow by expansion;
a second stage coupled to the first stage, wherein the second stage has a second diameter greater than the first diameter, and the second stage is configured to depressurize the bleed flow by expansion; and
an outlet coupled to the second stage, wherein the outlet is configured to direct the bleed flow to the exhaust outlet, and the inlet, the first stage, and the outlet are disposed along parallel axes, and the outlet is downstream of a combustor; and
at least one diffuser plate disposed at the inlet, the first stage, the second stage, or the outlet, or a combination thereof, wherein the at least one diffuser plate is configured to depressurize the bleed flow.

18. The system of claim 17, wherein the compressor is configured to produce a compressed air flow, and the bleed system comprises a valve configured to control the bleed flow to less than 10% of the compressed air flow.

19. The system of claim 17, wherein the at least one diffuser plate comprises a first diffuser plate coupled to the first stage, a second diffuser plate coupled to the second stage, and a third diffuser plate coupled to the outlet.

* * * * *